(12) United States Patent
Seino et al.

(10) Patent No.: US 8,012,631 B2
(45) Date of Patent: Sep. 6, 2011

(54) LITHIUM ION CONDUCTIVE SULFIDE-BASED SOLID ELECTROLYTE AND ALL-SOLID LITHIUM BATTERY USING SAME

(75) Inventors: Yoshikatsu Seino, Sodegaura (JP); Masaru Nakagawa, Sodegaura (JP); Minoru Senga, Sodegaura (JP); Masatoshi Shibata, Sodegaura (JP)

(73) Assignee: Idemitsu Kosan Co., Ltd, Tokyo (JP)

( * ) Notice: Subject to any disclaimer, the term of this patent is extended or adjusted under 35 U.S.C. 154(b) by 0 days.

(21) Appl. No.: 12/096,481

(22) PCT Filed: Nov. 28, 2006

(86) PCT No.: PCT/JP2006/323702
§ 371 (c)(1),
(2), (4) Date: Oct. 14, 2008

(87) PCT Pub. No.: WO2007/066539
PCT Pub. Date: Jun. 14, 2007

(65) Prior Publication Data
US 2009/0159839 A1    Jun. 25, 2009

(30) Foreign Application Priority Data
Dec. 9, 2005   (JP) .................................. 2005-356889

(51) Int. Cl.
*H01M 6/18* (2006.01)
*H01M 4/13* (2010.01)
*B05D 5/12* (2006.01)
*B05D 3/00* (2006.01)
*B05D 3/04* (2006.01)
*B05D 3/10* (2006.01)

(52) U.S. Cl. .................... 429/304; 429/231.95; 429/322; 427/58; 423/299; 423/303; 423/312

(58) Field of Classification Search .............. 429/231.95, 429/322, 304, 248; 204/192.12; 427/402, 427/58; 423/303
See application file for complete search history.

(56) References Cited

U.S. PATENT DOCUMENTS

| | | | |
|---|---|---|---|
| 7,416,815 B2 * | 8/2008 | Ota et al. ................. | 429/231.95 |
| 2005/0107239 A1 | 5/2005 | Akiba et al. | |
| 2007/0160911 A1 * | 7/2007 | Senga et al. ................. | 429/322 |

FOREIGN PATENT DOCUMENTS

| | | | |
|---|---|---|---|
| JP | 2002-109955 | | 4/2002 |
| JP | 2003-206111 | | 7/2003 |
| JP | 2003-208919 | | 7/2003 |
| JP | 2004-348972 | | 12/2004 |
| JP | 2004-348973 | | 12/2004 |
| JP | 2005-228570 | * | 8/2005 |
| JP | 2006-277997 | | 10/2006 |

OTHER PUBLICATIONS

H. Wada, et al., "Preparation and Ionic Conductivity of New $B_2S_3$-$Li_2S$-LiI Glasses", *Materials Research Bulletin*, Feb. 1983, vol. 18, No. 2, pp. 189-193.

R. Mercier, et al., "Superionic Conduction in $Li_2S$-$P_2S_5$-LiI-Glasses", *Solid State Ionics*, Oct. 1981, vol. 5, pp. 663-666.

Fuminori Mizuno, et al., "All Solid-state Lithium Secondary Batteries Using High Lithium Ion Conducting $Li_2S$-$P_2S_5$ Glass-Ceramics", Chemistry Letters 2002, No. 12, The Chemical Society of Japan, Dec. 5, 2002, pp. 1244-1245 (with 2 cover pages).

Fuminori Mizuno, et al., "New, highly Ion-Conductive Crystals Precipitated from $Li_2S$-$P_2S_5$ Glasses", Advanced Materials 2005, vol. 17, No. 7, Apr. 4, 2005, pp. 918-921, (with cover page).

\* cited by examiner

*Primary Examiner* — Ling-Siu Choi
*Assistant Examiner* — Monique Peets
(74) *Attorney, Agent, or Firm* — Oblon, Spivak, McClelland, Maier & Neustadt, L.L.P.

(57) ABSTRACT

A solid electrolyte including a lithium (Li) element, a phosphorus (P) element and a sulfur (S) element, the $^{31}P$ MAS NMR spectrum thereof having a peak ascribed to a crystal at 90.9±0.4 ppm and 86.5±0.4 ppm; and the ratio ($x_c$) of the crystal in the solid electrolyte being from 60 mol % to 100 mol %.

5 Claims, 5 Drawing Sheets

LITHIUM ION CONDUCTIVE SULFIDE-BASED SOLID ELECTROLYTE AND ALL-SOLID LITHIUM BATTERY USING SAME

TECHNICAL FIELD

The invention relates to a sulfide-based solid electrolyte and an all-solid lithium battery using the same.

BACKGROUND

In recent years, there has been an increasing demand for a high-performance lithium secondary battery for use, for example, in portable information terminals, portable electronic devices, domestic small electronic energy storage devices, two-wheel motor bicycles using a motor as a power source, electric automobiles, and hybrid electric automobiles. With such a trend, further improvement in safety and performance of secondary batteries has been desired.

Conventional electrolytes which exhibit high lithium ion conductivity at room temperature are mostly liquids. For example, organic liquid electrolytes are known to be a material which exhibits high lithium ion conductivity at room temperature.

Conventional organic liquid electrolytes are flammable since they contain an organic solvent. Therefore, actual use of an ion conductive material which contains an organic solvent as a battery electrolyte involves concern for liquid leakage or risk of ignition.

Furthermore, due to its liquidity, not only lithium ions but also counter anions are also conducted in such an electrolyte. Therefore, the lithium ion transport value thereof is not 1. In addition, exposure of such a battery to high temperatures (to 300° C.) results in decomposition and vaporization of the electrolyte, causing bursting or other problems of a battery. Due to these disadvantages, the organic liquid electrolyte has only a limited application range.

To ensure safety, studies have been made on the use of an inorganic solid electrolyte instead of an organic solvent electrolyte as the electrolyte for secondary batteries. The inorganic solid electrolyte is inflammable or hardly flammable by nature, and is a safe material as compared to an electrolyte generally used. Under such circumstances, development of all-solid lithium batteries having a high degree of safety has been desired.

To meet such a demand, various studies have been made on sulfide-based solid electrolytes. As lithium ion conductive solid electrolytes exhibiting a high ionic conductivity, sulfide glass having an ionic conductivity of $10^{-3}$ S/cm has been found in the 1980s, examples of which include LiI—$Li_2S$—$P_2S_5$, LiI—$Li_2S$—$B_2S_3$ and LiI—$Li_2S$—$SiS_2$ (see Non-Patent Document Nos. 1 and 2, for example). These electrolytes are free from problems such as ignition and bursting. However, due to the low glass transition temperature or phase transition temperature, these electrolytes encounter a problem in which the performance thereof deteriorates when exposed to temperatures around 280° C.

Characteristic features of all-solid lithium batteries using a solid electrolyte reside in that they are capable of being operated at significantly high temperatures as compared with lithium batteries using an organic liquid electrolyte, and they are possibly resistant to solder reflowing. For the protection of environment, lead-free solders have come to be used instead of lead solders. While lead soldering is conducted at 230° C. to 240° C., lead-free soldering is conducted at 260° C. to 290° C. There is a tendency that reflow soldering temperature has been on the increase. Thus, solid electrolytes which are more improved in heat resistance have been required.

Non-Patent Document 1: H. Wada, Mater. Res, Bul 18 (1983) 189

Non-Patent Document 2: Ren't Mercier, solid state Ionics 5 (1981) 663-666

The invention has been made in view of the above-mentioned problems. An object of the invention is to provide a solid electrolyte having a high lithium ion conductivity and heat resistance, and to provide an all-solid lithium solid battery improved in heat resistance.

SUMMARY OF INVENTION

As a result of intensive studies, the inventors have found that a phosphorus element and a sulfur element constituting a solid electrolyte form a specific crystal structure, and a solid electrolyte containing a predetermined amount of such a crystal structure is improved in lithium ion conductivity and heat resistance. The invention has been made based on this finding.

The invention provides the following solid electrolyte and all-solid lithium battery.

1. A solid electrolyte comprising a lithium (Li) element, a phosphorus (P) element and a sulfur (S) element, $^{31}$P MAS NMR spectrum of the solid electrolyte thereof having peaks assigned to a highly ion conductive crystal at 90.9±0.4 ppm and 86.5±0.4 ppm; and the ratio ($x_c$) of the a highly ion conductive crystal in the solid electrolyte being from 60 mol % to 100 mol %.

2. The solid electrolyte according to 1 which has a $^7$Li spin-lattice relaxation time $T_{1Li}$<500 ms at room temperature (25° C.) by solid-state $^7$LiNMR spectroscopy.

3. A method for producing the solid electrolyte according to 1 or 2 comprising subjecting sulfide glass containing a lithium (Li) element, a phosphorus (P) element and a sulfur (S) element to a heat treatment at 190° C. to 220° C. for 3 hours to 240 hours or a heat treatment at 220° C. to 340° C. for 12 minutes to 230 hours.

4. A solid electrolyte for a lithium secondary battery comprising the solid electrolyte according to 1 or 2.

5. An all-solid lithium battery obtained by using the solid electrolyte for a lithium secondary battery.

The invention can provide the solid electrolyte having high lithium ion conductivity.

BEST MODE FOR CARRYING OUT THE INVENTION

The solid electrolyte of the invention is a solid electrolyte containing a lithium (Li) element, a phosphorus (P) element, and a sulfur (S) element, which is characterized by satisfying the following requirements (1) and (2):
(1) The $^{31}$P Magic Angle Spinning (MAS) NMR spectrum has peaks corresponding to a highly ion conductive crystal at 90.9±0.4 ppm and 86.5±0.4 ppm; and
(2) The ratio ($x_c$) of the highly ion conductive crystal exhibiting the peaks in (1) in the solid electrolyte is from 60 mol % to 100 mol %.

The two peaks in requirement (1) are observed when highly ion conductive crystal components are present in the solid electrolyte. Specifically, these peaks are assigned to $P_2S_7^{4-}$ and $PS_4^{3-}$ in the crystal.

Requirement (2) specifies the ratio ($x_c$) of the above-mentioned crystal in the solid electrolyte.

If the highly ion conductive crystal components are present in the solid electrolyte in an amount above a predetermined level, specifically, 60 mol % or more, lithium ions are caused to move mainly through the highly ion conductive crystal. As a result, as compared with a case where lithium ions are caused to move through a non-crystalline part (glass part) or a crystal lattice (e.g. $P_2S_6^{-4}$) which does not exhibit high ionic conductivity, lithium ion conductivity improves. It is preferred that the ratio $x_c$ be from 65 mol % to 100 mol %.

The above-mentioned ratio $x_c$ of the crystal can be controlled by adjusting the temperature and time of the heat treatment of the sulfide glass as the raw material.

The conditions for the $^{31}$P MAS NMR spectrum measurement and the method for calculating the ratio $x_c$ are described in detail in the following Examples.

In the solid electrolyte of the invention, the spin-lattice relaxation time $T_{1Li}$ measured at room temperature (25° C.) by the solid-state $^7$LiNMR spectroscopy is preferably 500 ms or less. The relaxation time $T_{1Li}$ serves as an index of molecular mobility in the solid electrolyte which contains a glass state or both a crystal state and a glass state. A shorter $T_{1Li}$ results in a higher molecular mobility. A high molecular mobility leads to increased ion conductivity since lithium ions are migrated easily during discharge. As mentioned above, in the invention, since the highly ionic conductive crystal components are contained in a predetermined amount or more, $T_{1Li}$ can be rendered 500 ms or less. It is preferred that $T_{1Li}$ be 350 ms or less. The lower limit is 50 ms, which is the theoretical $T_{1Li}$ minimum for BPP model.

The solid electrolyte of the invention can be produced by subjecting sulfide glass containing lithium (Li), phosphorus (P) and sulfur (S) elements to heat treatment at 190° C. to 220° C. for 3 hours to 240 hours, or at 220° C. to 340° C. for 12 minutes to 230 hours.

As the raw material of the sulfide glass, $Li_2S$ and $P_2S_5$ may be used, for example.

There are no particular restrictions on $Li_2S$. Commercially available $Li_2S$ can be used. $Li_2S$ having a high degree of purity is preferable. For example, it is preferable to use $Li_2S$ obtained by reacting lithium hydroxide and hydrogen sulfide in a non-proton organic solvent, followed by purification by washing at a temperature of 100° C. or higher using an organic solvent.

Specifically, it is preferable to produce $Li_2S$ by the method disclosed in JP-A-07-330312, and is preferable to purify the resulting $Li_2S$ by the method described in WO2005/40039.

This method for producing $Li_2S$ results in the reduction of the raw material cost of sulfide glass since high-purity lithium sulfide can be obtained in a simple manner. The above-mentioned purification method is economically advantageous since impurities contained in $Li_2S$ such as sulfur oxide and lithium N-methylaminobutylate (hereinafter referred to as LMAB) can be removed by a simple treatment.

It is preferred that the total contents of sulfur oxide and LMAB contained in $Li_2S$ be 0.15 mass % or less and 0.1 mass % or less, respectively.

There are no particular restrictions on $P_2S_5$ insofar as it is commercially produced and sold. Instead of $P_2S_5$, elemental phosphorus (P) and elemental sulfur (S) may be used with a corresponding molar ratio. Elemental phosphorus (P) and elemental sulfur (S) may be used without specific restrictions insofar as they are commercially produced and sold.

The mixing ratio of the above-mentioned raw materials may be adjusted appropriately without particular restrictions. Preferably, the ratio of $Li_2S$ and $P_2S_5$ is about 7:3 (molar ratio).

Examples of the method for forming sulfide glass include the melt quenching method and the mechanical milling method (hereinafter often referred to as the MM method).

Specifically, in the case of melt quenching, predetermined amounts of $P_2S_5$ and $Li_2S$ are mixed in a mortor and pelletized, and the resulting pellets are put in a carbon-coated quartz tube and vacuum-sealed. After reaction at a predetermined temperature, the pellets are quenched by putting on ice, whereby sulfide glass is obtained.

This reaction is conducted preferably at a temperature of 400° C. to 1,000° C., more preferably 800° C. to 900° C.

This reaction time is preferably 0.1 hour to 12 hours, more preferably 1 to 12 hours.

In the case of the MM method, predetermined amounts of $Li_2S$ and $P_2S_5$ are mixed in a mortor, and the resulting mixture is reacted by the mechanical milling method for a predetermined period of time, whereby sulfide glass is obtained.

In the MM method, it is preferable to use a ball mill, specifically, a planetary ball mill. In the planetary ball mill, a pot is rotated on its axis, while a wheel revolves around the pot, whereby significantly high impact energy can be generated efficiently.

As for the conditions of the MM method using a planetary ball mill, for example, a rotational speed of several ten to several hundred revolutions/min and a treatment time of 0.5 to 100 hours are satisfactory.

Specific methods for producing sulfide glass are described above. The production conditions including temperature and time may be adjusted appropriately according to equipment used.

Then, the resulting sulfide glass is heat-treated at a predetermined temperature, whereby the solid electrolyte of the invention is formed.

The temperature of the heat treatment for forming the electrolyte is preferably 190° C. to 340° C., more preferably 195° C. to 335° C., and particularly preferably 200° C. to 330° C.

If the temperature of the heat treatment is 190° C. or lower, a highly ion conductive crystal may not be obtained. If the treatment temperature exceeds 340° C., a crystal with low ionic conductivity may be generated.

The heat treatment time is preferably 3 hours to 240 hours when the heat treatment temperature is 190° C. to 220° C., particularly preferably 4 hours to 230 hours. When the heat treatment temperature is 220° C. to 340° C., it is preferable to conduct heat treatment for 12 minutes to 230 hours, further preferably 18 minutes to 230 hours.

If the heat treatment time is shorter than 12 minutes, a highly ion conductive crystal may not be obtained. If the heat treatment time is longer than 230 hours, a crystal with low ionic conductivity may be generated.

The solid electrolyte of the invention is an inorganic solid which is inflammable or hardly flammable. Furthermore, the electrolyte of the invention has an electrolytic potential of at least 10 V. While maintaining a lithium ion transport ratio of 1, the solid electrolyte of the invention is capable of exhibiting significantly high lithium ion conductivity on the order of $10^{-3}$ S/cm at room temperature. Therefore, the solid electrolyte of the invention is quite suited as a solid electrolyte material of a lithium battery. In addition, the solid electrolyte of the invention is excellent in heat resistance.

The solid electrolyte of the invention can be used preferably in a lithium secondary battery, especially as an all-solid lithium battery, by combining with a positive electrode active material and a negative electrode active material.

Examples of the positive electrode active materials for the all-solid lithium battery include sulfide-based materials such as titanium sulfide ($TiS_2$), molybdenum sulfide ($MOS_2$), iron sulfate (FeS, $FeS_2$), copper sulfide (CuS) and nickel sulfide ($Ni_3S_2$). Preferably, $TiS_2$ may be used.

As for oxide-based materials, bismuth oxide ($Bi_2O_3$), bismuth plumbate ($Bi_2Pb_2O_5$), copper oxide (CuO), vanadium oxide ($V_6O_{13}$), lithium cobaltate ($LiCoO_2$), lithium nickalate ($LiNiO_2$), lithium manganate ($LiMnO_2$) or the like can be used. Lithium cobaltate is preferably used.

In addition to the above, niobium selenide ($NbSe_3$) may be used.

As the negative electrode active material for the all-solid lithium battery, a carbon material may be used. Specific examples of the carbon material include artificial graphite, graphite carbon fibers, resin-fired carbon, thermo-decomposable vapor grown carbon fibers, coke, mesocarbon microbeads (MCMB), furfuryl alcohol resin fired carbon, polyacene, pitched-based carbon fibers, vapor-grown carbon fibers, natural graphite and non-graphitizing carbon. Artificial graphite is preferable.

The all-solid lithium battery of the invention operates as a battery without suffering from side reactions even when the electrolyte and electrode material as mentioned above are allowed to contact, mixed and exposed to high temperatures. In addition, the all-solid lithium battery of the invention has a high energy density and is excellent in safety, charge-discharge cycle properties, and long-term stability.

EXAMPLES

Solid electrolytes produced in Examples and Comparative Examples were measured for $^{31}P$ MAS NMR spectrum, crystallization degree $x_c$, and spin-lattice relaxation time $T_{1Li}$ by the following method.

(1) $^{31}P$ MAS NMR Spectrum
Apparatus: JNM-CMXP302NMR spectrometer manufactured by JEOL Ltd.
Detected nucleus: $^{31}P$
Observed frequency: 121.339 MHz
Measurement temperature: Room temperature
Pulse sequence: Single pulse
90° pulse width: 4 μs
Speed of magic angle spinning: 8600 Hz
Period between successive accumulations: 100 to 2000 seconds
(set such that it becomes 5 times or more of the maximum $^7Li$ spin-lattice relaxation time)
Number of accumulations: 64 times
The chemical shift was determined by using $(NH_4)_2HPO_4$ (chemical shift: 1.33 ppm) as an external standard.

To prevent a sample from being denatured by moisture in air at the time of filling a tube with a sample, the sample was added to a sealable tube in a dry box in which dry nitrogen is continuously flown.

(2) Crystallization Degree $x_c$ of Highly Ion Conductive Crystal

The crystallization degree of highly ion conductive crystals was calculated by curve resolution fitting of the resonance in a range of 70 to 120 ppm of $^{31}P$ MAS NMR spectrum under the condition mentioned in (1). The method for calculating the crystallization degree $x_c$ is described below in detail by referring to an example of the spectrum obtained.

Figure 1:
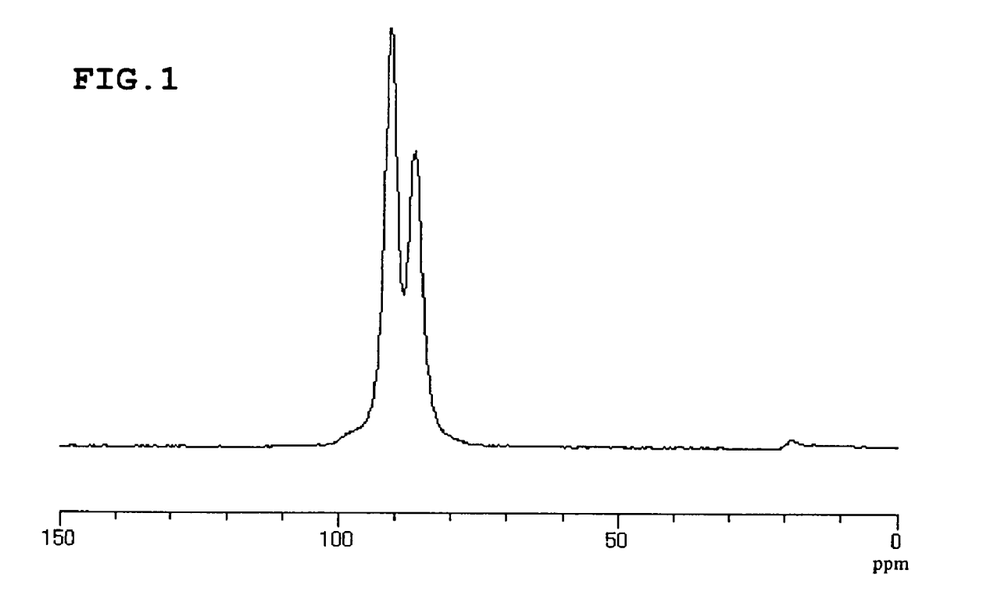
FIG. 1 shows an example of $^{31}$P MAS NMR spectrum having peaks only at 90.9±0.4 ppm and 86.5±0.4 ppm.

(A) Case where the $^{31}P$ MAS NMR Spectrum has Peaks Only at 90.9±0.4 ppm and 86.5±0.4 ppm (see FIG. 1)

Figure 2:
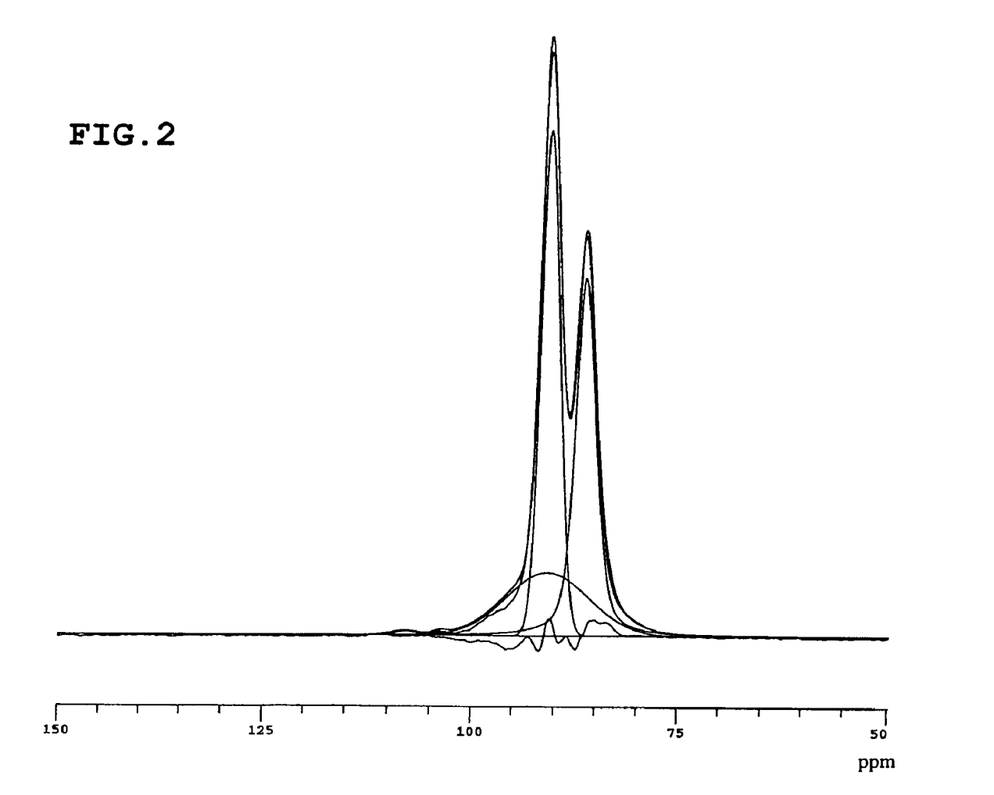
FIG. 2 shows deconvolution of $^{31}$P MAS NMR spectrum shown in FIG. 1 into Gaussian curves.

The resonance observed in a range of 70 to 120 ppm of this spectrum is analyzed by curve resolution fitting with 3 Gaussian curves shown in Table 1, using the non-linear least square method (see FIG. 2).

TABLE 1

| No. | Peak position (ppm) | Line width (Hz) | Assignment |
|---|---|---|---|
| 1 | 86.5 ± 0.4 | 200-500 | Crystal |
| 2 | 90.9 ± 0.4 | 200-500 | Crystal |
| 3 | 91.0 ± 0.4 | 1200-1800 | Glass |

Taking the peak area ratios of peaks 1, 2 and 3 as $I_{86.5}$, $I_{90.9}$ and $I_{91.0}$, respectively, the ratio $x_c$ (mol %) of the crystal exhibiting peaks at 86.5±0.4 ppm and 90.9±0.4 ppm is calculated by the following equation:

$$x_C=100\times(I_{86.5}+I_{90.9})/(I_{86.5}+I_{90.9}+I_{91.0})$$

(B) Case where the $^{31}P$ MAS NMR Spectrum has a Peak in Addition to Those of 90.9±0.4 ppm and 86.5±0.4 ppm When $0<x_c<30$, the spectrum may not be analyzed accurately by the above-mentioned 3 Gaussian curves. This is due to the difference in structure in the glass region, and separation adjusted according to this difference is required.

Figure 3:
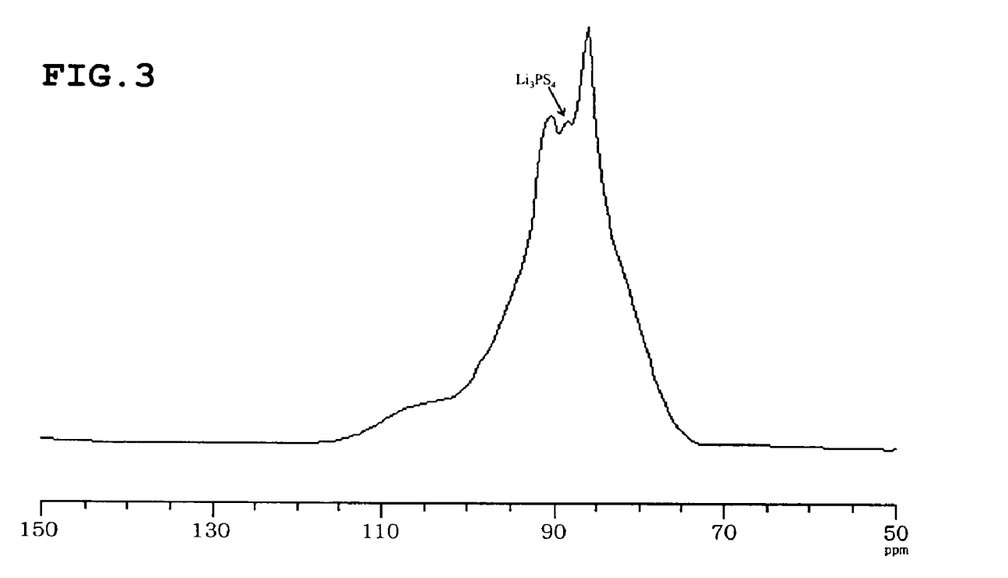
FIG. 3 shows an example of $^{31}$P MAS NMR spectrum having a peak corresponding to a $Li_3PS_4$ crystal.

In addition to the crystal exhibiting peaks at 86.5±0.4 ppm and 90.9±0.4 ppm, peaks corresponding to $Li_3PS_4$ crystal may be observed at 88.6±0.3 ppm (see FIG. 3).

Figure 4:
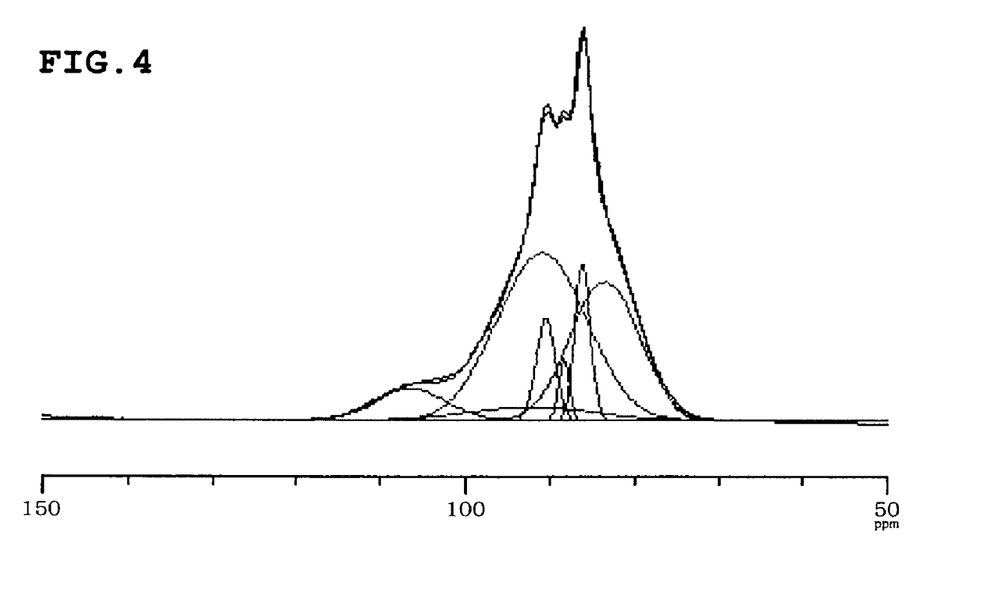
FIG. 4 shows deconvolution of $^{31}$P MAS NMR spectrum shown in FIG. 3 into Gaussian curves.

In the above-mentioned case, the resonance observed in a range of 70 to 120 ppm is analyzed by using the non-linear least square method with 6 to 7 Gaussian curves (7 curves when the peak corresponding to $Li_3PS_4$ is observed, otherwise 6 curves) shown in Table 2 (FIG. 4).

TABLE 2

| No. | Peak position (ppm) | Line width (Hz) | Assignment |
|---|---|---|---|
| 1 | 86.5 ± 0.4 | 200-500 | Crystal |
| 2 | 90.9 ± 0.4 | 200-500 | Crystal |
| 3 | 83.5 ± 0.4 | 1000-1300 | Glass |
| 4 | 91.0 ± 0.4 | 1200-1800 | Glass |
| 5 | 92.2 ± 0.4 | 1800-2200 | Glass |
| 6 | 106.6 ± 0.4 | 1000-1700 | Glass |
| 7 | 88.6 ± 0.3 | 100-300 | Crystal ($Li_3PS_4$) |

When the area ratios of peaks 1 to 7 are termed as $I_{86.5}$, $I_{90.9}$, $I_{83.5}$, $I_{91.0}$, $I_{92.2}$, $I_{106.6}$ and $I_{88.6}$, respectively, the ratio $x_c$ (mol %) of the crystal exhibiting peaks at 86.5±0.4 ppm and 90.9±0.4 ppm is calculated by the following equation:

$$x_C=100\times(I_{86.5}+I_{90.9})/(I_{86.5}+I_{90.9}+I_{83.5}+I_{91.0}+I_{92.2}+I_{106.6}+I_{88.6})$$

Figure 5:
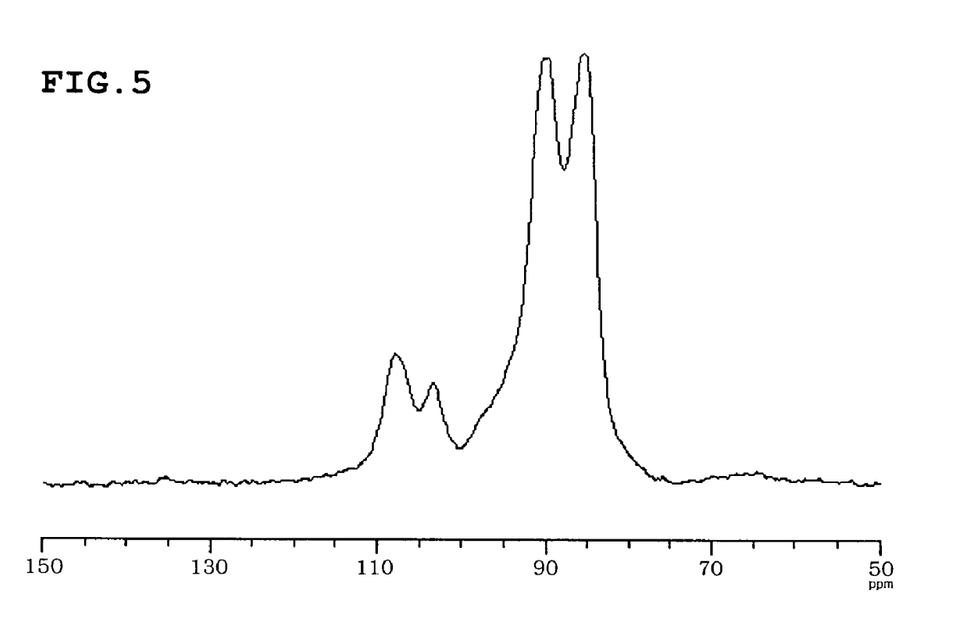
FIG. 5 shows an example of $^{31}$P MAS NMR spectrum which consists of the resonance at 108.5±0.6 ppm and 104.4±0.4 ppm.

(C) Case where Peaks are Observed at 108.5±0.6 ppm and 104.4±0.4 ppm (see FIG. 5)

Figure 6:
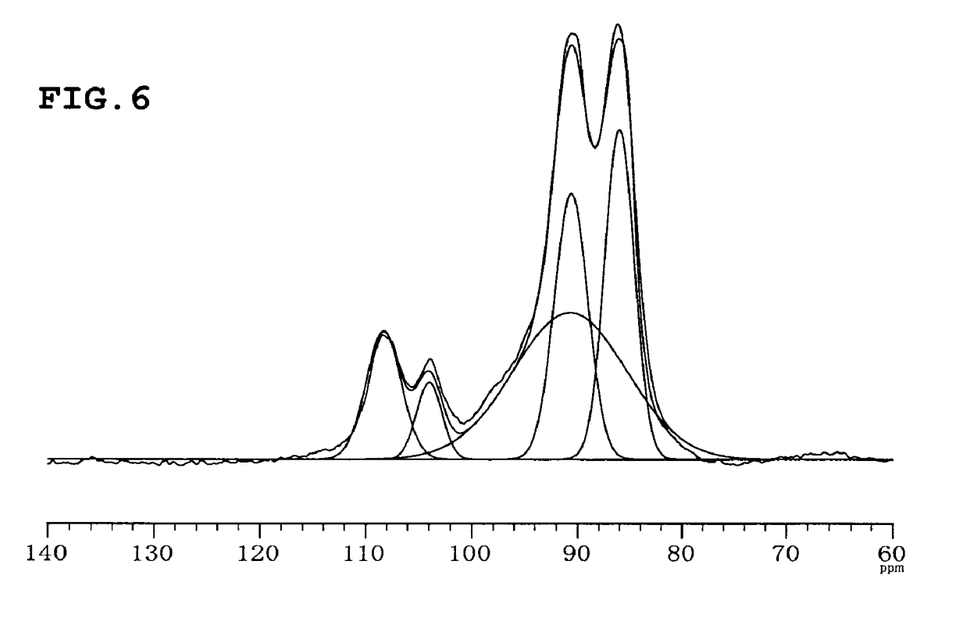
FIG. 6 shows deconvolution of the spectrum shown in FIG. 5 into Gaussian curves.

When $x_C>30$, a peak corresponding to $Li_4P_2S_6$ crystal may be observed at 108.5±0.6 ppm and another peak may be observed at 104.4±0.4 ppm (assignment is unknown). In this case, the resonance in a range of 70 to 120 ppm is analyzed by curve resolution fitting with 5 Gaussian curves shown in Table 3 (FIG. 6).

TABLE 3

| No. | Peak position (ppm) | Line width (Hz) | Assignment |
|---|---|---|---|
| 1 | 86.5 ± 0.4 | 200-500 | Crystal |
| 2 | 90.9 ± 0.4 | 200-500 | Crystal |
| 3 | 91.0 ± 0.4 | 1200-1800 | Glass |
| 4 | 104.4 ± 0.4 | 200-500 | Unknown |
| 5 | 108.5 ± 0.6 | 200-500 | Crystal ($Li_4P_2S_6$) |

Taking the peak area ratios of peaks 1 to 5 as $I_{86.5}$, $I_{90.9}$, $I_{91.0}$, $I_{104.4}$ and $I_{108.5}$, respectively, the ratio $x_c$ (mol %) of the crystal exhibiting peaks at 86.5±0.4 ppm and 90.9±0.4 ppm is calculated by the following equation:

$$x_c=100\times(I_{86.5}+I_{90.9})/(I_{86.5}+I_{90.9}+I_{91.0}+I_{104.4}+I_{108.5})$$

(3) Spin-Lattice Relaxation Time of $T_{1Li}$
Apparatus: JNM-CMXP302NMR spectrometer manufactured by JEOL Ltd.
Detected nucleus: $^7Li$
Observed frequency: 116.489 MHz
Measurement temperature: Room temperature (25° C.)
Measuring method: Saturation recovery method (pulse sequence FIG. 7)
90° pulse width: 4 μs
Speed of magic angle spinning: 6000 Hz
Period between successive accumulations: 5 seconds
Number of accumulations: 64 times The chemical shift was determined by using LiBr (chemical shift: 2.04 ppm) as an external standard.

To prevent a sample from being denatured by moisture in air at the time of filling a tube with a sample, the sample was added to a sealable tube in a dry box in which dry nitrogen is continuously flown.

Figure 7:
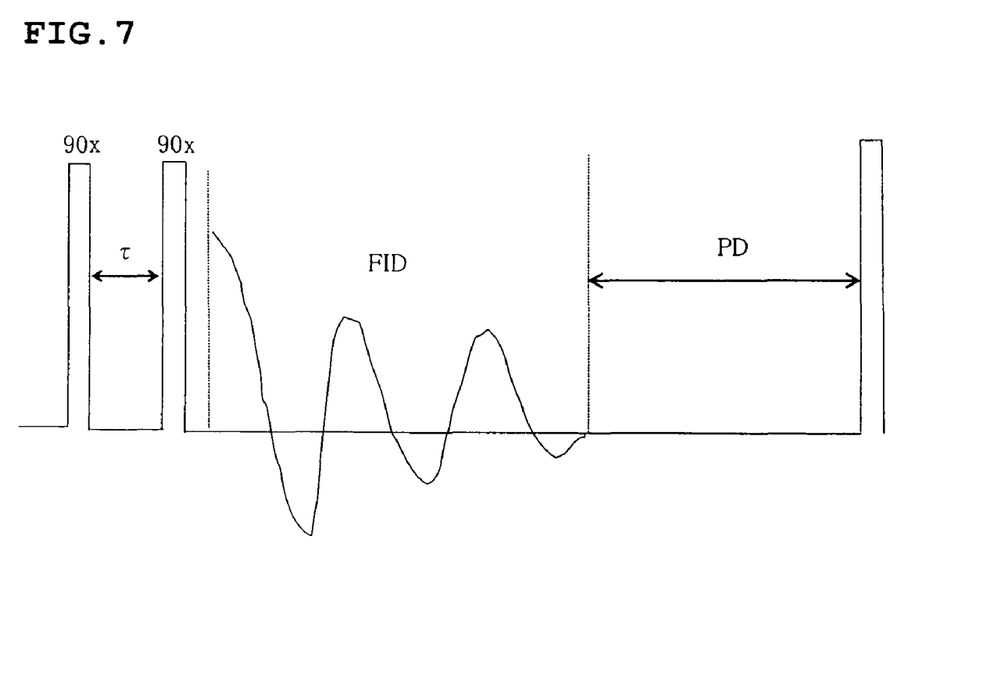
FIG. 7 shows a pulse sequence used for the measurement of the spin-lattice relaxation time.
Figure 8:
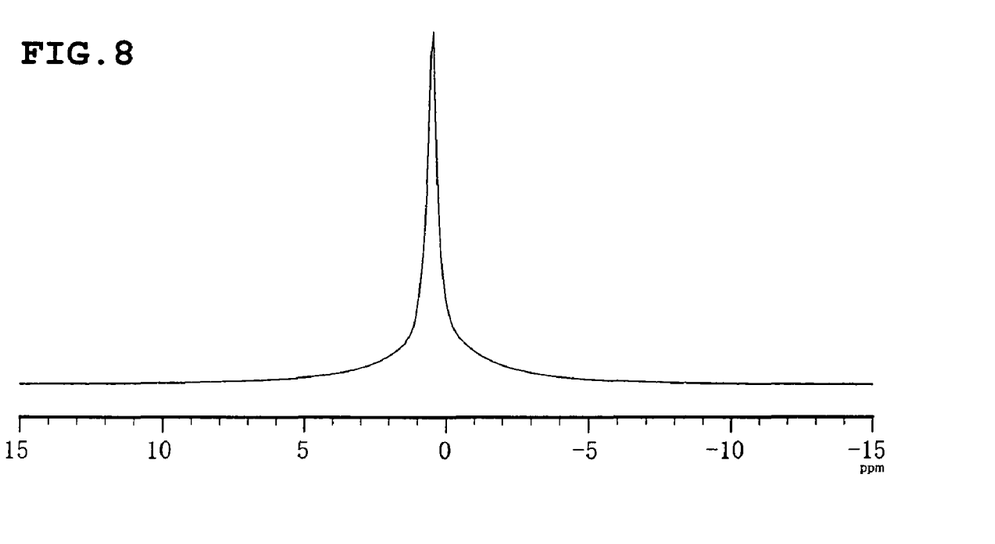
FIG. 8 shows an example of $^7$Li MAS NMR spectrum.
Figure 9:
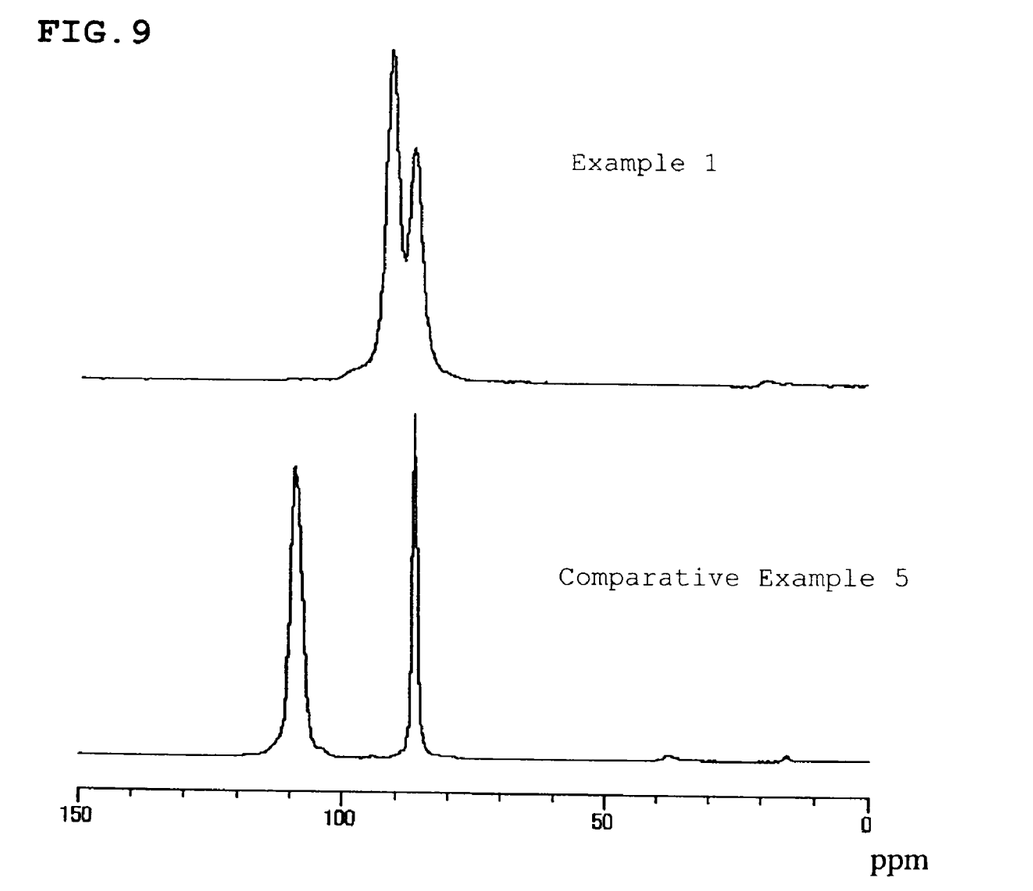
FIG. 9 shows $^{31}$P MAS NMR spectra of the solid electrolytes of Example 1 and Comparative Example 5.

If $^7LiNMR$ spectrum is recorded under the above-mentioned conditions, a single peak is observed in a range of 0-1 ppm (see FIG. 8). To determine the $T_{1Li}$ values, recovery of experimental magnetization obtained by the pulse sequences shown in FIG. 7 is fitted to the exponential function.

$$M(\tau)=M(\infty)(1-e^{-\tau/T_{1Li}})$$

M(τ): Peak intensity at τ

Example 1

0.6508 g (0.01417 mol) of highly pure lithium sulfide (manufactured by Idemitsu Kosan Co., Ltd., purity: 99.9%) and 1.3492 g (0.00607 mol) of diphosphorusus pentasulfide (manufactured by Sigma-Aldrich Japan) were mixed sufficiently, and the powder was put in an aluminum pot and the pot was completely sealed.

The pot was installed in a planetary ball mill, and mechanical milling was performed. For the first several minutes from the start, milling was conducted at a small number of revolution (85 rpm) with the aim of fully mixing the starting materials. Thereafter, the number of revolution was gradually increased, and mechanical milling was conducted at 370 rpm for 20 hours.

Evaluation by X-ray analysis of the resulting powder revealed that the powder was vitrified (sulfide glass).

The resulting sulfide glass was subjected to heat treatment at 300° C. for 2 hours to be ceramized, whereby a solid electrolyte was formed.

The ion conductivity of this solid electrolyte was measured by the alternate current impedance method (measurement frequency: 100 Hz to 15 MHz), and found to be $4.0\times10^{-3}$ S/cm at room temperature.

The ionic conductivity, crystal ratio $x_c$, relaxation time $T_{1Li}$ and presence or absence of a peak at 90.9±0.4 ppm and 86.5±0.4 ppm of the solid electrolytes formed in Example 1 and the following examples and comparative examples are shown in Table 4.

TABLE 4

| Example | Heat treatment temperature (° C.) | Heat treatment time (h) | Ionic conductivity (S/cm) | $x_c$ (mol %) | $T_{1Li}$ (ms) | Presence or absence of peak | |
|---|---|---|---|---|---|---|---|
| | | | | | | 90.9 ± 0.4 ppm | 86.5 ± 0.4 ppm |
| Example 1 | 300 | 2 | $4.0 \times 10^{-3}$ | 78 | 270 | Present | Present |
| Example 2 | 220 | 240 | $2.6 \times 10^{-3}$ | 66 | 340 | Present | Present |
| Example 3 | 330 | 1 | $5.0 \times 10^{-3}$ | 85 | 240 | Present | Present |
| Example 4 | 300 | 1 | $2.3 \times 10^{-3}$ | 75 | 400 | Present | Present |
| Example 5 | 320 | 30 min | $3.2 \times 10^{-3}$ | 79 | 280 | Present | Present |
| Example 6 | 320 | 1 | $2.4 \times 10^{-3}$ | 81 | 440 | Present | Present |
| Example 7 | 340 | 18 min | $2.7 \times 10^{-3}$ | 72 | 260 | Present | Present |
| Com. Ex. 1 | — | — | $1.0 \times 10^{-4}$ | 0 | 1400 | Absent | Absent |
| Com. Ex. 2 | 200 | 2 | $2.0 \times 10^{-4}$ | 10 | 730 | Present | Present |
| Com. Ex. 3 | 200 | 10 min | $2.2 \times 10^{-4}$ | 0 | 1350 | Absent | Absent |
| Com. Ex. 4 | 220 | 10 min | $2.1 \times 10^{-4}$ | 0 | 1380 | Absent | Absent |
| Com. Ex. 5 | 300 | 250 | $8.7 \times 10^{-7}$ | 0 | 2000 | Absent | Present |
| Com. Ex. 6 | 25→250 | 10° C./min | $2.1 \times 10^{-3}$ | 55 | 340 | Present | Present |

$x_c$: Crystal ratio
$T_{1Li}$: Relaxation time

Example 2

A solid electrolyte was prepared and evaluated in the same way as in Example 1, except that the heat treatment of the sulfide glass was changed to 220° C. for 240 hours. The ionic conductivity of this solid electrolyte was $2.6\times10^{-3}$ S/cm.

Example 3

A solid electrolyte was prepared and evaluated in the same way as in Example 1, except that the heat treatment of the sulfide glass was changed to 330° C. for 1 hour. The ionic conductivity of this solid electrolyte was 5.0×10$^{-3}$ S/cm.

Example 4

A solid electrolyte was prepared and evaluated in the same way as in Example 1, except that the heat treatment of the sulfide glass was changed to 300° C. for 1 hour. The ionic conductivity of this solid electrolyte was 2.3×10$^{-3}$ S/cm.

Example 5

A solid electrolyte was prepared and evaluated in the same way as in Example 1, except that the heat treatment of the sulfide glass was changed to 320° C. for 30 minutes. The ionic conductivity of this solid electrolyte was 3.2×10$^{-3}$ S/cm.

Example 6

A solid electrolyte was prepared and evaluated in the same way as in Example 1, except that the heat treatment of the sulfide glass was changed to 320° C. for 1 hour. The ionic conductivity of this solid electrolyte was 2.4×10$^{-3}$ S/cm.

Example 7

A solid electrolyte was prepared and evaluated in the same way as in Example 1, except that the heat treatment of the sulfide glass was changed to 340° C. for 18 minutes. The ionic conductivity of this solid electrolyte was 2.7×10$^{-3}$ S/cm.

Comparative Example 1

The sulfide glass that was not subjected to heat treatment in Example 1 was evaluated. The ionic conductivity of this sulfide glass was 1.0×10$^{-4}$ S/cm.

Comparative Example 2

A solid electrolyte was prepared and evaluated in the same way as in Example 1, except that the heat treatment of the sulfide glass was changed to 200° C. for 2 hours. The ionic conductivity of this solid electrolyte was 2.0×10$^{-4}$ S/cm.

Comparative Example 3

A solid electrolyte was prepared and evaluated in the same way as in Example 1, except that the heat treatment of the sulfide glass was changed to 200° C. for 10 minutes. The ionic conductivity of this solid electrolyte was 2.2×10$^{-4}$ S/cm.

Comparative Example 4

A solid electrolyte was prepared and evaluated in the same way as in Example 1, except that the heat treatment of the sulfide glass was changed to 220° C. for 10 minutes. The ionic conductivity of this solid electrolyte was 2.1×10$^{-4}$ S/cm.

Comparative Example 5

A solid electrolyte was prepared and evaluated in the same way as in Example 1, except that the heat treatment of the sulfide glass was changed to 300° C. for 250 hours. The ionic conductivity of this solid electrolyte was 8.7×10$^{-7}$ S/cm.

Comparative Example 6

A solid electrolyte was prepared and evaluated in the same manner as in Example 1, except that the heat treatment of the sulfide glass was conducted while elevating the temperature from 25° C. to 250° C. at a rate of 10° C./min. The ionic conductivity of the solid electrolyte was 2.1×10$^{-3}$ S/cm.

Industrial Applicability

The solid electrolyte of the invention is suited for use as a solid electrolyte of a lithium secondary battery.

The all-solid lithium battery can be used as a lithium secondary battery used in portable information terminals, portable electronic devices, domestic small electronic energy storage devices, two-wheel motor bicycles using a motor as a power source, electric automobiles, and hybrid electric automobiles.

The invention claimed is:

1. A solid electrolyte comprising a lithium (Li) element, a phosphorus (P) element and a sulfur (S) element,
   a $^{31}$P Magic Angle Spinning (MAS) NMR spectrum thereof having a peak corresponding to a highly ion conductive crystal at 90.9±0.4 ppm and 86.5±0.4 ppm; and
   a ratio ($x_c$) of the highly ion conductive crystal in the solid electrolyte is from 60 mol % to 100 mol %.

2. The solid electrolyte according to claim 1 which has a spin-lattice relaxation time $T_{1Li}$<500 ms at room temperature (25° C.) measured by the solid-state $^7$Li NMR spectroscopy.

3. An all-solid lithium battery comprising the solid electrolyte according to claim 2.

4. The solid electrode according to claim 1, wherein $x_c$ is from 65 mol % to 100 mol %.

5. The solid electrode according to claim 2, wherein $T_{1Li}$ is 350 ms or less at room temperature (25° C.).

* * * * *